United States Patent [19]

Schlegel

[11] 4,083,933
[45] * Apr. 11, 1978

[54] PROCESS FOR PREPARING $AlH_3(PO_4)_2 \cdot 3H_2O$

[75] Inventor: Albert Schlegel, Frankfurt am Main, Germany

[73] Assignee: Hoechst Aktiengesellschaft, Frankfurt am Main, Germany

[*] Notice: The portion of the term of this patent subsequent to May 3, 1994, has been disclaimed.

[21] Appl. No.: 701,817

[22] Filed: Jul. 1, 1976

Related U.S. Application Data

[63] Continuation-in-part of Ser. No. 543,496, Jan. 23, 1975, Pat. No. 4,021,528.

[30] Foreign Application Priority Data

Jan. 26, 1974 Germany .............................. 2403707
Jul. 12, 1975 Germany .............................. 2531258

[51] Int. Cl.² .................... C01B 15/16; C01B 25/26
[52] U.S. Cl. .................................... 423/308; 423/305; 423/311; 23/301; 23/305 A
[58] Field of Search .................... 423/305, 307–313; 23/300, 301 R, 305 A

[56] References Cited

U.S. PATENT DOCUMENTS

| | | | |
|---|---|---|---|
| 2,538,867 | 1/1951 | Greger | 423/309 |
| 3,801,704 | 4/1974 | Kobayashi et al. | 423/311 |

OTHER PUBLICATIONS

Brosheer et al. Journal of the American Chemical Society 76, p. 5951, 1954.
F. D. Ivoire Bull Chim France, p. 2285 1961.
Industrial and Engineering Chemistry, vol. 53, No. 8 p. 617, 1961.

*Primary Examiner*—O. R. Vertiz
*Assistant Examiner*—Gregory A. Heller
*Attorney, Agent, or Firm*—Curtis, Morris & Safford

[57] ABSTRACT

Crystalline $AlH_3(PO_4)_2 \cdot 3H_2O$ is obtained from an aqueous solution of aluminum phosphate containing a molar ratio of $Al_2O_3:P_2O_5$ of from 1:2 to 1:6 and an organic solvent that is miscible with water. Crystallization is enhanced by the addition of $AlH_3(PO_4)_2 \cdot 3H_2O$ seed crystals to the aqueous solution. The product is useful in reducing the setting time of hydraulic binders.

26 Claims, No Drawings

PROCESS FOR PREPARING ALH$_3$(PO$_4$)$_2$·3H$_2$O

This application is a continuation-in-part of application Ser. No. 543,496, filed Jan. 23, 1975 (now U.S. Pat. No. 4,021,528).

The present invention relates to a process for preparing crystalline AlH$_3$(PO$_4$)$_2$·3H$_2$O from a solution comprising water, an organic solvent miscible with water and an aluminum phosphate.

It is already known that small quantities of AlH$_3$(PO$_4$)$_2$·3H$_2$O are formed in the presence of AlPO$_4$, phosphoric acid and water (cf. Journ. Am. Chem. Soc. 76 (1954), 5951). The same applies to the system Al(OH)$_3$·H$_3$PO$_4$ and water (cf. Bull. Soc. chim. France (1961), 2285).

Owing to the fact that a relatively long period of time, from several weeks to several months is necessary to obtain even small quantities of AlH$_3$(PO$_4$)$_2$·3H$_2$O, these methods of preparation are not practical.

The AlH$_3$(PO$_4$)$_2$·3H$_2$O is a valuable accelerator for setting hydraulically settable mixtures of building materials, therefore, an economically attractive process for preparing it was desired.

The present invention is particularly directed to a method of making crystalline AlH$_3$(PO$_4$)$_2$·3H$_2$O which comprises first preparing a solution of water, an organic solvent miscible with water and aluminum phosphate having a molar ratio of Al$_2$O$_3$:P$_2$O$_5$ in the range of 1:2 to 1:6, subsequently crystallizing AlH$_3$(PO$_4$)$_2$·3H$_2$O from said solution and recovering said AlH$_3$(PO$_4$)$_2$·3H$_2$O.

The aqueous solution from which the AlH$_3$(PO$_4$)$_2$·3H$_2$O is crystallized may be prepared by various different procedures. For example, an aqueous solution of aluminum phosphate may be prepared and the organic solvent slowly added thereto; crystalline Al(H$_2$PO$_4$)$_3$ may be dissolved in an organic solvent, such as ethanol to obtain an aluminum phosphate solvent solution and water slowly added thereto; and Al(OH)$_3$ can be reacted in an organic solvent with phosphoric acid to form a solution of aluminum phosphate, water and organic solvent.

Aqueous aluminum phosphate solutions can be obtained by reacting Al (metallic), Al$_2$O$_3$ and Al(OH)$_3$ with phosphoric acid containing water; and aqueous-organic solvent-aluminum phosphate solutions can be prepared by reacting Al (metallic), Al$_2$O$_3$ and Al(OH)$_3$ with phosphoric acid (containing water) in an organic solvent.

The preparation of the solutions from which the AlH$_3$(PO$_4$)$_2$·3H$_2$O is crystallized is preferably carried out in such a manner that no immediate precipitate is formed, for example as the organic solvent is slowly, i.e. gradually added to an aqueous aluminum phosphate solution. A rapid addition of the organic solvent to the aqueous aluminum phosphate solution may produce precipitation of amorphous aluminum phosphates. The solution of water, an organic solvent miscible with water and aluminum phosphate after preparation can exist as such for a significant period of time, for example 1-2 hours, prior to the commencement of crystallization of AlH$_3$(PO$_4$)$_2$·3H$_2$O taking place.

The term aluminum phosphate as used herein is intended to include the aluminum salts of orthophosphoric acids, and the acid salts thereof.

The crystallization which normally takes place in several days, for example about 6 to 8 days, can be enhanced and appreciably accelerated by the addition of crystalline AlH$_3$(PO$_4$)$_2$·3H$_2$O seed crystals in which case the crystallization can take place in 12 to 24 hours.

The order in which the water, organic solvent, aluminum phosphate and seed crystals are brought together to form the solution from which crystallization takes place is not particularly critical except that it is necessary that the materials with the exception of the seed crystals form a solution. For example, the seed crystals can be added to an aqueous aluminum phosphate solution and the organic solvent can be added thereto; the organic solvent can be added to an aqueous aluminum phosphate solution and the seed crystals added thereto; and the seed crystals can be added to the organic solvent and the solvent added to an aqueous aluminum phosphate solution. The AlH$_3$(PO$_4$)$_2$·3H$_2$O seed crystals are difficulty soluble in aqueous aluminum phosphate and in the organic solvent and normally do not go into solution.

A preferred method of the present invention comprises preparing the solution of aluminum phosphate and water, slowly, i.e. gradually adding an organic solvent miscible with water thereto while stirring to obtain the solution, adding seed crystals and crystallizing AlH$_3$(PO$_4$)$_2$·3H$_2$O from said solution.

It was found that if the organic solvent is added too rapidly there is a risk that an amorphous aluminum phosphate precipitate is obtained. The required slow rate of addition of the organic solvent can be determined by a simple test run. An especially pure final product can be obtained by, after the addition of the organic solvent, filtering the resulting solution to remove any small amounts of amorphous aluminum phosphates that may have inadvertently been formed, adding the seed crystals to the filtrate and then carrying out the crystallization step.

According to the present invention AlH$_3$(PO$_4$)$_2$·3H$_2$O may be readily prepared with excellent yields of more than 90% of theoretical yield. A molar proportion of Al$_2$O$_3$:P$_2$O$_5$ of from about 1:2 to 1:6, preferably about 1:2.5 to 1:3.2 and more preferably of about 1:3 can be used. In the latter case Al(H$_2$PO$_4$)$_3$ may be used as a starting material and may be reacted with water and solvents, whereby a reaction according to the following equation takes place.

$$Al(H_2PO_4)_3 + 3H_2O \rightarrow AlH_3(PO_4)_2 \cdot 3H_2O + H_3PO_4$$

or isolating Al(H$_2$PO$_4$)$_3$ may be advantageously dispensed with, because its preparation is very complicated. It is quite sufficient to start with solutions of a similar composition (e.g. having the same molar proportion of Al$_2$O$_3$/P$_2$O$_5$, i.e. of about 1:3) which may be easily prepared, e.g. from aluminum hydroxide and phosphoric acid and to add water miscible, i.e. soluble organic solvents thereto. Starting solutions having other molar proportions of Al$_2$O$_3$/P$_2$O$_5$ may also be used.

The reaction time required according to the aforesaid process may be further reduced by slightly increasing the reaction temperature. The temperature, however, is not a critical factor. The process may be carried out at all temperatures, at which water or organic solvents neither solidify nor boil. Temperatures of from 15° to 50° C are advantageous. Temperatures of from 30° to 40° C are especially advantageous.

It is surprising that the desired phosphate AlH$_3$(PO$_4$)$_2$·3H$_2$O may be prepared from Al(H$_2$PO$_4$)$_3$ according to the process of the invention, since it is known that Al(H$_2$PO$_4$)$_3$ crystals are extremely sensitive to humidity, deliquesce in air giving a clear, viscous liquid and dissolve in a small quantity of cold water to yield a completely clear solution without forming AlH$_3$(PO$_4$)$_2$·3H$_2$O. It is therefore surprising that yields of AlH$_3$(PO$_4$)$_2$·3H$_2$O of more than 90% of the theory are obtained by the addition of the organic solvent.

A small quantity of water is required to permit growing of the AlH$_3$(PO$_4$)$_2$·3H$_2$O crystals in the mother liquor. The yield of the aforesaid product, however, decreases with an increasing water content. It is therefore advantageous to start with highly concentrated aluminum phosphate solutions. The preferred aqueous aluminum phosphate solution contain 50 to 85.5% by weight of aluminum phosphate, for example as Al(H$_2$PO$_4$)$_3$.

Large excesses of free phosphoric acid cause a reduction of the yield of AlH$_3$(PO$_4$)$_2$·3H$_2$O. It is therefore advantageous to start with aluminum phosphate solutions having an atomic ratio of Al/P of from about 1:2 to 1:3 since, in this case, relatively little phosphoric acid will accumulate in the mother liquor in the course of the crystallization process.

Examples of suitable solvents are those miscible with water to an unlimited extend. Alcohols having from 1 to 3 carbon atoms, carboxylic acids having from 1 to 3 carbon atoms, acetonitrile, acetone, dioxane and tetrahydrofurane have proved advantageous. Ethanol has proved especially advantageous.

Glycerin cannot be used perhaps due to the fact that the high viscosity of the solution considerably slows down the growing of the crystals. A series of solvents miscible with pure water to an unlimited extent form two liquid phases with the aluminum phosphate solution, but after precipitation of the crystalline AlH$_3$(PO$_4$)$_2$·3H$_2$O one liquid phase is only present, for example in the case of tetrahydrofurane and isopropanol.

Solvents miscible with water to a limited extent may also be used. It has become evident that solvents having a solubility in water in room temperature of about 1 to 10% may be used. Among these solvents there may be mentioned, for example ketones having from 4 to 6 carbon atoms such as methyl isobutyl-ketone or cyclohexanone, carboxylic acid alkyl ester having from 2 to 4 carbon atoms, such as for example methyl or ethyl formiate or methyl acetate and aliphatic alcohols having from 4 to 6 carbon atoms such as isoamyl alcohol or cyclohexanol.

Solvents boiling at a temperature below 100° C are advantageous for an easier recovering of the organic solvent by distillation.

A suitable solvent added in the crystallization process generally should have the following characteristics:
a. It should dissolve Al(H$_2$PO$_4$)$_3$ readily.
b. It should readily dissolve the byproduct H$_3$PO$_4$ formed.
c. It should not dissolve AlH$_3$(PO$_4$)$_2$·3H$_2$O and thus act as a precipitating agent.
d. It should be well miscible with H$_2$O.
e. It should reduce the viscosity of the solution.

The optimal quantity of the solvent added depends on the water content of the aluminum phosphate solution and of the relation Al$_2$O$_3$:P$_2$O$_5$. The greater the content of free phosphoric acid and unreacted water, the more organic solvent is required for improving the yield. Amounts of from 40 to 90% by volume of organic solvent based on total solution have proved advantageous. Especially in the case of ethanol the quantities of organic solvent to be added range of from 50 to 400 ml/mole of residual phosphoric acid.

However, if excessive amounts of organic solvents miscible with water to an unlimited extent are used, significant amounts of undesirable amorphous aluminum phosphate precipitates may form. The risk of forming amorphous precipitates is substantially eliminated by adding only from 66 to 100% by volume of solvent, based on the volume of aqueous aluminum phosphate solution. On the other hand, there is substantially little risk of forming amorphous precipitates when using organic solvents which are miscible with water to a limited extent.

An especially advantageous method of the process according to the invention consists in recycling the mother liquors to the process after treating them so that a complete conversion is obtained.

In the preparation of AlH$_3$(PO$_4$)$_2$·3H$_2$O from crystallized Al(H$_2$PO$_4$)$_3$ according to the equation:

Al(H$_2$PO$_4$)$_3$ + 3H$_2$O → AlH$_3$(PO$_4$)$_2$·3H$_2$O + H$_3$PO$_4$ the mother liquor obtained is a mixture of H$_3$PO$_4$, water and the organic solvent. The solvent is distilled off and recycled to the process. The remaining water containing H$_3$PO$_4$ may be reused for preparing the aluminum phosphate starting material. In the preparation of AlH$_4$(PO$_4$)$_2$·3H$_2$O from an aluminum phosphate solution having approximately the composition Al$_2$O$_3$:P$_2$O$_5$ = 1:3 according to the equations

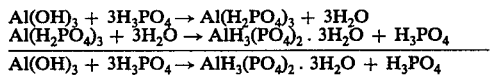

Al(OH)$_3$ + 3H$_3$PO$_4$ → Al(H$_2$PO$_4$)$_3$ + 3H$_2$O
Al(H$_2$PO$_4$)$_3$ + 3H$_2$O → AlH$_3$(PO$_4$)$_2$·3H$_2$O + H$_3$PO$_4$
─────────────────────────────
Al(OH)$_3$ + 3H$_3$PO$_4$ → AlH$_3$(PO$_4$)$_2$·3H$_2$O + H$_3$PO$_4$ in the presence of an organic solvent miscible with water, the mother liquor obtained is a solution wherein the complete quantity of water of the originally used diluted H$_3$PO$_4$ is accumulated.

The organic solvent is advantageously distilled off and recycled to the process. The remaining diluted H$_3$PO$_4$ may be reused as follows:
a. H$_3$PO$_4$ is concentrated up to the original content by distilling off the excess of water and is recycled to the process.
b. The original concentration of unconsumed H$_3$PO$_4$ is obtained by adding P$_2$O$_5$ or highly concentrated H$_3$PO$_4$ and H$_3$PO$_4$ is reused.
c. The diluted H$_3$PO$_4$ is used for producing further products (for example complex fertilizers), wherein the low content of aluminum phosphate does not matter.

AlH$_3$(PO$_4$)$_2$·3H$_2$O is a white, finely crystalline powder resistant to humid atmospheres.

It has been found that AlH$_3$(PO$_4$)$_2$·3H$_2$O can be used as an accelerator for the setting of hydraulically settable mixtures of building materials such as methyl cellulose containing premixed plasters and flooring plaster materials, preferably cement bound.

It is already known that the setting and, consequently, the hardening of cement and other hydraulic binders may be accelerated by the addition of various chemicals.

Additions of chlorides such as calcium or aluminum chloride, alkali silicates, alkali carbonates and alkali phosphates are often used for this purpose.

These additions generally have certain disadvantages; the chlorides, for example, stimulate corrosion, the alkali salts increase the content of water soluble satls and cause efflorescences.

It has been proved that the setting process, for example, of methyl cellulose containing hydraulically setting premixed plasters may be essentially accelerated without any inconvenience by adding to the plaster mixture a small quantity of finely divided acid aluminum phosphate of the formula $AlH_3(PO_4)_2 \cdot 3H_2O$. This addition is advantageously maintained in the range of from 0.02 to 10% calculated on the hydraulic binder or of from 0.05 to 5% calculated on the dry mixture of building material.

It has been proved that the time required till the beginning of the setting of the hydraulic binder when not using an addition of $AlH_3(PO_4)_2 \cdot 3H_2O$ can be reduced half or up to a quarter or less depending on the quantity of the addition of $AlH_3(PO_4)_2 \cdot 3H_2O$.

The following data show the effect obtained by the addition of acid aluminum phosphate according to the invention, the setting time of a lime-cement plaster without or with methyl cellulose being determined by means of the Vicat conus apparatus (DIN 1168). This measuring method was chosen in accordance with the treating method of premixed plasters mechanically applied in a single coat.

| Plaster mixture consisting of: | Time of Setting: |
|---|---|
| 200 p.b.w. of Portland cement<br>100 p.b.w. of white lime hydrate<br>700 p.b.w. of quartz sand of from<br>0 to 0.6 mm | |
| without addition of accelerator | about 290 minutes |
| with the addition of<br>1 p.b.w. of methyl cellulose | about 330 minutes |
| without the addition of methyl cellulose<br>but with the addition of 5 p.b.w. of<br>$Al_3(PO_4)_2 \cdot 3H_2O$ | about 75 minutes |
| with the addition of<br>1 p.b.w. of methyl cellulose<br>5 p.b.w. of $Al_3(PO_4)_2 \cdot 3H_2O$ | about 90 minutes |

From the aforesaid data it can be seen that the setting process is extremely accelerated by acid aluminum phosphate.

The process according to the invention may be advantageously used for accelerating the setting process especially of such hydraulic plaster materials containing nonionic cellulose ethers for the purpose of improving the adhesion and the water retention properties.

It is already known that said hydraulic binders show a considerable retardation of the setting process. Owing to the fact that the setting time required for hydraulically bound plasters containing cellulose ethers and processed by hand or mechanically is too long and the operation process is considerably impeded, the addition of the aforesaid setting accelerator offers real advantages. The finishing of the plasters can be effected after 1 to 2 hours whereas hydraulic plasters which have not been accelerated can only be smoothed after 4 to 5 hours.

The processibility of a plaster accelerated by acid aluminum phosphate can be additionally improved by adding small amounts of from 0.01 to 0.1% of an air entraining agent which additionally reduces the crack formation.

$AlH_3(PO_4)_2 \cdot 3H_2O$ may be used alone or combined with aluminum hydroxides or alkali phosphates for obtaining a determined setting curve.

$AlH_3(PO_4)_2 \cdot 3H_2O$ or the combination thereof with further accelerators may be added to the plaster mixture by grinding it with the binder or by adding it to the premixed plaster. When adding the substance to the precast plaster a fineness of less than 100 μ is required in order to obtain a maximum effect.

Examples for using $AlH_3(PO_4)_2 \cdot 3H_2O$ in mixtures of building materials are as follows:

EXAMPLE I
- 700 p.b.w. of sand (quartz or limestone sand) of from 0 to 1 mm size
- 200 p.b.w. of Portland cement
- 100 p.b.w. of white lime hydrate
- 0.5 p.b.w. of an air entraining agent
- 1.5 p.b.w. of methyl hydroxyethyl cellulose
- 5.0 p.b.w. of $AlH_3(PO_4)_2 \cdot 3H_2O$ EXAMPLE II
- 750 p.b.w. of sand (quartz or limestone sand) of from 0 to 1 mm
- 250 p.b.w. of highly hydraulic lime
- 0.5 p.b.w. of an air entraining agent
- 1.5 p.b.w. of methyl hydroxyethyl cellulose
- 5.0 p.b.w. of $AlH_3(PO_4)_2 \cdot 3H_2O$ EXAMPLE III
- 700 p.b.w. of sand (quartz or limestone sand) of from 0 to 1 mm size
- 100 p.b.w. of Portland cement clinkers
- 150 p.b.w. of limestone flour
- 50 p.b.w. of white lime hydrate
- 0.5 p.b.w. of air entraining agent
- 1.5 p.b.w. of methyl hydroxyethyl cellulose
- 0.5 p.b.w. of $AlH_3(PO_4)_2 \cdot 3H_2O$ EXAMPLE IV
- 800 p.b.w. of sand (quartz or limestone sand) of from 0 to 1 mm size
- 200 p.b.w. of Portland cement
- 0.5 p.b.w. of air entraining agent
- 1.5 p.b.w. of methyl hydroxyethyl cellulose
- 5.0 p.b.w. of $AlH_3(PO_4)_2 \cdot 3H_2O$ EXAMPLE V
- 850 p.b.w. of chalky sandstone reactor material
- 100 p.b.w. of Portland cement
- 50 p.b.w. of lump slag
- 0.5 p.b.w. of air entraining agent
- 1.5 p.b.w. of methyl hydroxyethyl cellulose
- 5.0 p.b.w. of $AlH_3(PO_4)_2 \cdot 3H_2O$ EXAMPLE VI
- 300 p.b.w. of Portland cement
- 700 p.b.w. of sand of from 0 to 1 mm size
- 3 p.b.w. of $AlH_3(PO_4)_2 \cdot 3H_2O$
- 0.5 p.b.w. of air entraining agent The following examples illustrate the invention.

EXAMPLE 1:

78 g of $Al(OH)_3$ (= 1 mole) and 387 gms of a 76% $H_3PO_4$ (= 3 moles of $H_3PO_4$) were mixed while stirring giving a suspension, which suspension was then heated while stirring to a temperature of from 35° to 40° C. The temperature of the reaction mixture then gradually increased due to the reaction heat without adding heat from the outside and reached from 105° to 110° C, whereby the reaction mixture considerably foamed for a short period. A clear solution was obtained, otherwise a brief heating is required.

After cooling to 35° C $AlH_3(PO_4)_2 \cdot 3H_2O$ crystals were inoculated into the solution while vigorously stirring and the solution was left over night at a temperature of 35° C while frequently stirring. The reaction product was then cooled to room temperature, 200 ml of ethanol were slowly introduced, i.e. gradually added, while stirring and the mixture was allowed to stand for 24 hours while frequently stirring. Then it was filtered off with suction and centrifuged. The crystals obtained were washed with alcohol in order to remove the adherent $H_3PO_4$ and dried at the air or in vacuo (at 25° C).

Yield of $AlH_3(PO_4)_2 \cdot 3H_2O$ : from 247 to 255 g = 90 — 95% of the theory.

EXAMPLE 2

50 gms of $Al(H_2PO_4)_3$ were mixed by stirring with 50 ml of ethanol giving a syrup and 25.5 mls of $H_2O$ were slowly introduced, i.e. gradually added. Thereafter the syrup was inoculated with $AlH_3(PO_4)_2\cdot 3H_2O$ crystals and left for 6 days at a temperature of about 20° C while frequently stirring. The crystalline slurry was then filtered off with suction, impressed on a clay plate and dried in air after washing it with ether or alcohol. Yield of $AlH_3(PO_4)_2\cdot 3H_2O$ : 41 g = 95% of the theory.

EXAMPLE 3

The example was carried out as example 2, but by using acetone instead of ethanol and the mixture was treated as described in example 2.

Yield of $AlH_3(PO_4)_2\cdot 3H_2O$ : 39 g = 91% of the theory.

EXAMPLE 4

The starting mixture prepared was the same as in example 2, but the reaction mixture was allowed to stand at a temperature of from 25° to 40° C after inoculating it. It could already be treated after 4 days according to example 2. Yield of $AlH_3(PO_4)_2\cdot 3H_2O$ : 40 g = 93% of the theory.

EXAMPLE 5

78 g of $Al(OH)_3$ were mixed by stirring with 200 mls of ethanol and 387 gms of phosphoric acid of 76% concentration were slowly added. Thereafter the temperature of the reaction mixture increased within 1 hour to 50° C without adding heat from the outside. The reaction mixture was heated and refluxed for about 10 minutes (interior temperature 83° C). The resulting product was cooled and insoluble products were filtered off. 100 mg of seeding crystals of $AlH_3(PO_4)_2\cdot 3H_2O$ were added and the reaction mixture was allowed to stand for 24 hours at a temperature of 35° C while frequently stirring. After suction-filtering 252 g of crystalline $AlH_3(PO_4)_2\cdot 3H_2O$ were obtained.

EXAMPLE 6

The example was performed in the same manner as in Example 5 but without adding seeding crystals. About 200 g of crystalline $AlH_3(PO_4)_2\cdot 3H_2O$ had precipitated after 8 days.

What is claimed is:

1. A process for preparing crystalline $AlH_3(PO_4)_2\cdot 3H_2O$ by crystallization from an aqueous solution which comprises first preparing a solution containing water, an organic solvent miscible with water and aluminum phosphate having a molar ratio of $Al_2O_3:P_2O_5$ of from 1:2 to 1:6, and subsequently crystallizing $AlH_3(PO_4)_2\cdot 3H_2O$ from said solution, and recovering crystalline $AlH_3(PO_4)_2\cdot 3H_2O$.

2. The process of claim 1 wherein $AlH_3(PO_4)_2\cdot 3H_2O$ seed crystals are added to said solution to enhance crystallization of $AlH_3(PO_4)_2\cdot 3H_2O$ from said solution.

3. The process of claim 1 wherein the organic solvent is a member selected from the group consisting of alcohols having from 1 to 3 carbon atoms, carboxylic acids having from 1 to 3 carbon atoms, acetonitrile, acetone, dioxane and tetrahydrofurane.

4. The process of claim 1 wherein the organic solvent is a member selected from the group consisting of ketones having from 4 to 6 carbon atoms, carboxylic acid esters having from 2 to 4 carbon atoms and aliphatic alcohols having from 4 to 6 carbon atoms.

5. The process of claim 1 wherein the solvent is a member selected from the group consisting of methyl isobutylketone, cyclohexanone, methyl formiate, ethyl formiate, methyl acetate, isoamyl alcohol and cyclohexanol.

6. A process for preparing crystalline $AlH_3(PO_4)_2\cdot 3H_2O$ from an aqueous aluminum phosphate solution, which comprises preparing an aluminum phosphate and water solution having a molar ratio of $Al_2O_3:P_2O_5$ of from 1:2 to 1:6, and slowly adding to said solution an organic solvent miscible with water, crystallizing said $AlH_3(PO_4)_2\cdot 3H_2O$ from solution and separating crystalline $AlH_3(PO_4)_2\cdot 3H_2O$ from solution.

7. The process of claim 6 wherein the aluminum phosphate solution is obtained by reacting aluminum hydroxide and phosphoric acid.

8. The process of claim 6 wherein the solution comprises $Al(H_2PO_4)_3$.

9. The process of claim 6 wherein 40 to 90% by volume of an organic solvent, based on total aluminum phosphate, water and solvent solution, is added to the aqueous solution.

10. The process of claim 6 wherein 50 to 400 mls. of organic solvent per mole of residual phosphoric acid are added to the aqueous solution.

11. The process of claim 1 wherein an aluminum compound and phosphoric acid are reacted in an organic solvent miscible with water to form an aluminum phosphate, water and organic solvent solution, and crystallizing $AlH_3(PO_4)_2\cdot 3H_2O$ from said solution.

12. The process of claim 11 wherein aluminum hydroxide and phosphoric acid are reacted in the organic solvent to obtain aluminum phosphate and water.

13. The process of claim 11 wherein $AlH_3(PO_4)_2\cdot 3H_2O$ seed crystals are added to the solution to enhance crystallization of the $AlH_3(PO_4)_2\cdot 3H_2O$ from said solution.

14. The process of claim 11 wherein aluminum hydroxide is added to the organic solvent and subsequently phosphoric acid is added to the solvent to form aluminum phosphate and water.

15. The process of claim 1 wherein aluminum hydroxide is added to an organic solvent comprising ethanol, phosphoric acid is subsequently added and reacted with the aluminum hydroxide to form a water, organic solvent, aluminum phosphate solution, $AlH_3(PO_4)_2\cdot 3H_2O$ seed crystals are added and $AlH_3(PO_4)_2\cdot 3H_2O$ is crystallized from the solution.

16. A process for preparing crystalline $AlH_3(PO_4)_2\cdot 3H_2O$, which comprises preparing an aqueous solution of an aluminum phosphate having a molar ratio of $Al_2O_3:P_2O_5$ of from 1:2 to 1:6, slowly adding to said solution an organic solvent miscible with water, crystallizing said $AlH_3(PO_4)_2\cdot 3H_2O$ from solution and recovering about 90% theoretical yield of crystalline $AlH_3(PO_4)_2\cdot 3H_2O$.

17. The process of claim 6, wherein the organic solvent is a member selected from the group consisting of alcohols having from 1 to 3 carbon atoms, carboxylic acids having from 1 to 3 carbon atoms, acetonitrile, acetone, dioxane and tetrahydrofurane.

18. The process of claim 6, wherein the organic solvent is a member selected from the group consisting of ketones having from 4 to 6 carbon atoms, carboxylic acid esters having from 2 to 4 carbon atoms and aliphatic alcohols having from 4 to 6 carbon atoms.

19. The process of claim 6, wherein the solvent is a member selected from the group consisting of methyl isobutylketone, cyclohexanone, methyl formiate, ethyl formiate, methyl acetate, isoamyl alcohol and cyclohexanol.

20. The process of claim 6, wherein the aqueous solution comprises an aluminum phosphate.

21. A process for preparing crystalline $AlH_3(PO_4)_2\cdot 3H_2O$ by crystallization from an aqueous solution which comprises preparing a solution containing water and aluminum phosphate having an aluminum phosphate concentration of 50 to 85.5% by weight and having a molar ratio of $Al_2O_3:P_2O_5$ of from 1:2 to 1:6, slowly adding to said solution an organic solvent miscible with water to form a solvent-solution mixture wherein said solvent is a member selected from the group consisting of alcohols having from 1 to 3 carbon atoms, carboxylic acids having from 1 to 3 carbon atoms, acetonitrile, acetone, dioxane and tetrahydrofurane, said solvent comprising about 40 to 90% by volume of said solvent-solution mixture, crystallizing $AlH_3(PO_4)_2\cdot 3H_2O$ from solution and recovering crystalline $AlH_3(PO_4)_2\cdot 3H_2O$ therefrom.

22. The process of claim 21, wherein the molar proportion of $Al_2O_3:P_2O_5$ is about 1:2.5 to 1:3.2.

23. The process of claim 21, wherein the crystallization is carried out at a temperature of about 15° to 50° C.

24. A process for preparing crystalline $AlH_3(PO_4)_2\cdot 3H_2O$ by crystallization from an aqueous solution which comprises preparing a solution containing water and aluminum phosphate having a molar ratio of $Al_2O_3:P_2O_5$ of from 1:2 to 1:6, slowly adding to said solution an organic solvent having a solubility in water at room temperature of about 1 to 10%, wherein said organic solvent is a member selected from the group consisting of ketones having from 4 to 6 carbon atoms, carboxylic acid esters having from 2 to 4 carbon atoms and aliphatic alcohols having from 4 to 6 carbon atoms and crystallizing $AlH_3(PO_4)_2\cdot 3H_2O$ from solution.

25. The process of claim 24 wherein the molar proportion of $Al_2O_3:P_2O_5$ is about 1:2.5 to 1:3.2.

26. The process of claim 24 wherein the crystallization is carried out at a temperature of about 15° to 50° C.

* * * * *